(No Model.)
J. SADLER.
Machine for Preparing and Welding Tube Sections.
No. 240,848. Patented May 3, 1881.
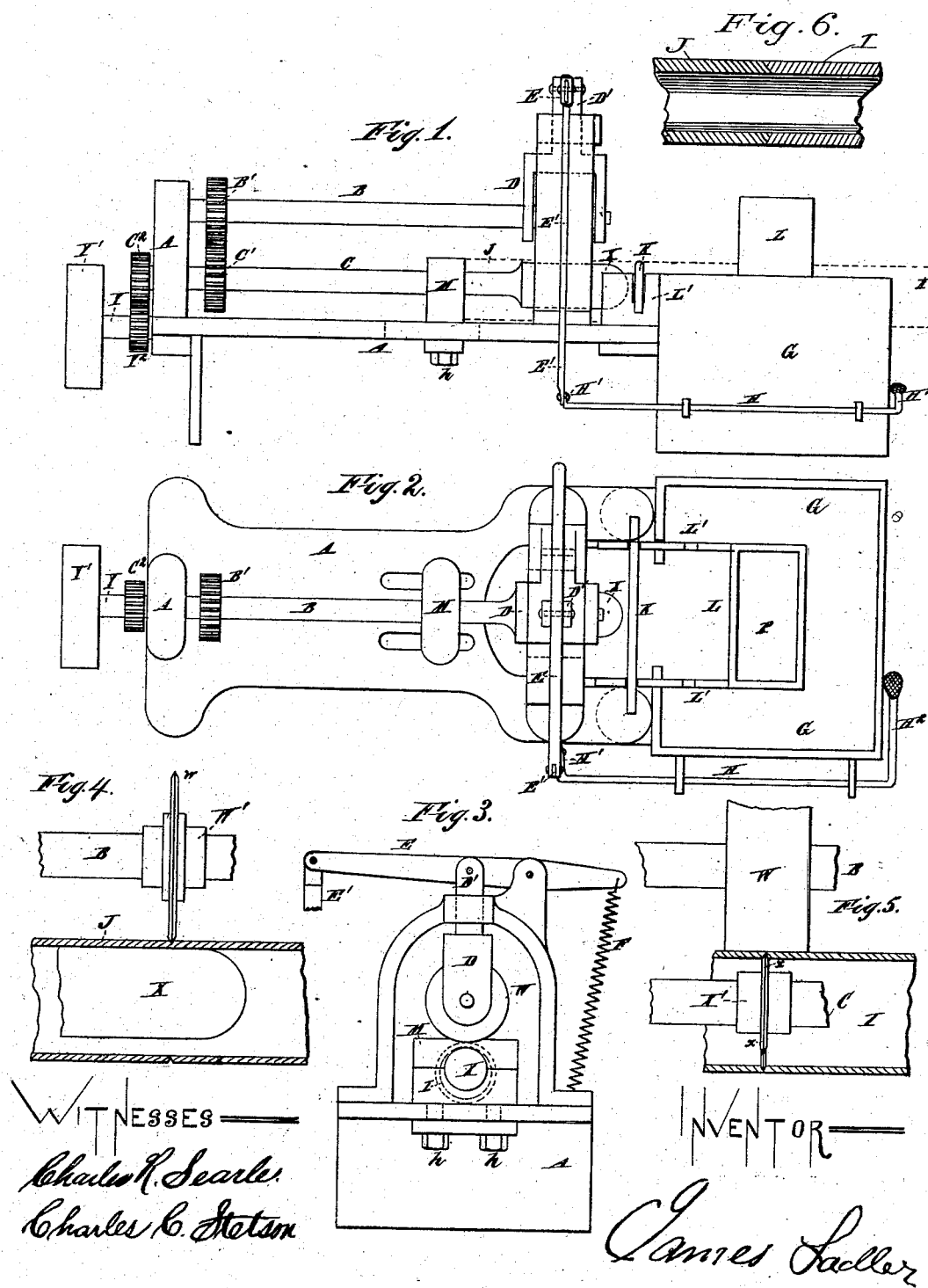

UNITED STATES PATENT OFFICE.

JAMES SADLER, OF NEW YORK, N. Y.

MACHINE FOR PREPARING AND WELDING TUBE-SECTIONS.

SPECIFICATION forming part of Letters Patent No. 240,848, dated May 3, 1881.

Application filed September 13, 1880. (No model.)

*To all whom it may concern:*

Be it known that I, JAMES SADLER, a citizen of the United States, residing in the city and county of New York, have invented certain new and useful Improvements in Machines for Preparing and Welding Tube-Sections, of which the following is a specification.

The object of the invention is to cut lengths of tube with an internal scarf on one length and an external scarf on the other, so that on being gently forced together endwise at a high heat they will be in condition for adhering and welding with only a moderate amount of radial compression. The same mechanism, with a change of the rollers, serves as a welding means. I have arranged for an unusually quick and convenient transfer of the metal from the furnace to the rolls. For steam-boilers and many other uses for which wrought-iron tubes are required the ends should be of a better quality of iron than is needed for the main portion of the tube. This has long been effected by welding a length of a few inches of superior iron on a tube of common iron.

My invention is particularly intended to facilitate this class of cutting and welding.

The accompanying drawings form a part of this specification, and represent what I consider the best means of carrying out the invention.

Figure 1 is a side elevation. Fig. 2 is a plan view of the same. Fig. 3 is an elevation with certain portions removed. Figs. 4 and 5 are side elevations, partly in section, showing the cutting devices removed. Fig. 6 is a view of the tubes, showing two scarfed sections together.

Similar letters of reference indicate like parts in the figures.

I mount in a suitable framing, A, two shafts, B C, one above the other, compelled to move together by gear-wheels B' C', and turned by a belt running on a pulley, Y', turned on a shaft, Y, and acting on the lower shaft, C, through gearing Y² C². The working end of the upper shaft, B, is raised and lowered by being held in a movable housing, D, fixed on a slide, D', and pressed downward by the lever E, to which is connected a link, E', pivoted at the bottom to an arm, H', extending from a rocking shaft, H, which is supported in fixed bearings, and is operated by the foot of the attendant applied on a treadle or lever, H². The return movement or elevation of the shaft B is effected by a spring, F. Near the working end of the lower shaft, C, is a bearing, M, which is adjustable forward and backward on the main framing A by means of bolts and nuts standing in slots in the frame, as shown. To change the position of this bearing M, the attendant reaches under the framing A and slackens the screws $h$. He then moves the bearing M backward or forward, as required, and when it is in the right position he again reaches under and tightens the screws $h$.

To use the machine for cutting off the tubes, I apply a cap or smooth roller on the end of the shaft B, and I apply a roller, X', on the lower shaft, C, carrying an annular knife, $x$, cast in or otherwise strongly secured upon its periphery. The knife, being of V-shaped section, produces a corresponding groove extending around the interior of the tube when the rolls are brought together, and this groove being deepened by the continued action of the cutter, the tube is divided nicely, leaving it with an internally-scarfed edge corresponding to the bevel of the knife. Having treated all the long tubes I with the machine thus organized, I remove the cutting-roll X' from the shaft C and substitute a smooth roll. I then remove the smooth roll W from the shaft B and substitute a roll, W', having a cutter, $w$, corresponding in section to the cutter in the roll X'; but in its application to the tube the bevel will cut in the reverse direction. Now, again starting the machine, I heat and successively present the tubes from which I desire to cut off the short lengths J, and putting them in the machine, the short lengths are cut off beveled in the opposite direction to the bevel of the long tubes I. This gives the proper lengths and also the proper scarfed edges for the two parts of the tube.

G is a casing, of boiler-iron or other suitable material, equipped with proper filling to form a hearth or bed of a forge-fire. It is either permanently or removably connected to the frame A, so that when the furnace is working the fire is close to the ends of the shafts B C, and in line therewith.

L is an internal casing, forming the top of the furnace P, to which may be fitted provisions (not represented) for conveying away the gaseous products of combustion. Vertical wings L′, notched as shown, extend from the hollow casing L toward the rollers, and serve to support a removable plate, K, which is kept carefully in position, except at the moment when a tube has been sufficiently heated in the furnace P and is ready to be welded. Any ordinary or suitable means (not shown) may be provided for blowing the fire.

Smooth rollers W and X, which may be the same as were partially used in the cutting off and scarfing, are fitted on the two shafts B and C. The lower roller, X, should be rounded or pointed at the end next the fire, a little swelled in the body, and its total diameter should be only a little less than that of the interior of the tubes to be welded. The upper roll, W, may be of the same size, or considerably larger or smaller. I esteem it an advantage that the surfaces of the two rolls W and X shall not move exactly alike, but that the upper one shall move a little faster than the lower.

The long and short lengths of a tube which are to be welded together are indicated by I J. They are previously scarfed by the means shown, and applied together with or without a welding-flux, and introduced into the fire in a position nearly or exactly in line with the lower shaft, C. The other end of the long tube I may be supported on any suitable horse or Y-frame. (Not shown.) When the proper welding-heat is attained the tubes are thrust endwise against the plate K, which partially welds and attaches the lengths I J, the plate K is temporarily removed, and a quick movement of the tubes thrusts them upon the lower roller, X, and the lever H² being at the same moment depressed by the foot, and the gripe of the hands on the tubes slackened, the upper roll, W, is brought down upon the tube, the whole is turned actively, and the entire joint subjected several times to the gentle squeezing action of the rollers, making a perfect and smooth weld. In thrusting the several tubes successively endwise upon the lower roll, X, to be thus welded, no care need be exercised in regard to the position. They are simply thrust endwise until the end of J abuts against the flat face of the bearing M. This bearing is made adjustable, as shown, to allow for welding on pieces J of different lengths.

Ordinary thin tubes may be rapidly heated, but they rapidly cool.

My machine allows of the heat being made available immediately for the welding.

In either the cutting or welding operations, it will be understood that when the machine is once adjusted for cutting off the short lengths J or the long lengths I the whole lot of tubes are cut, and when it is adjusted for welding the whole lot are welded.

Modifications may be made in many of the details.

In the furnace, instead of letting the products of combustion pass up through the casing L, I prefer in some kinds of work to fill the casing with fine coal rammed down upon a piece larger than the tubes, which is afterward removed, leaving an arch of fine coal. Good fuel of proper size being afterward liberally supplied, the glowing arch maintained by the coal-dust above tends to keep the heat in and makes the working of the furnace very desirable and uniform.

The bellied or rounded condition of the face of the lower roll may be varied within wide limits. I have obtained excellent results with both rollers as nearly cylindrical as I was able to make them.

In the working I can cut off the tubes hot or cold.

My invention applies usefully not only in welding better iron on the ends of new tubes, but also in the large class of cases where old tubes which have been cut out of a boiler or other apparatus for use in the arts may be reinserted by having new ends welded on.

I claim as my invention—

1. As an improvement in the art of preparing and welding tubes one to the other, severing the tubes by rotating beveled knives, operating the one on a tube from within outward and the other on a tube from the outer surface inward, then applying a tube end cut from the exterior in the tube end cut from the interior, then heating the joined ends and welding them by pressure, as described.

2. The shafts B C, with exchangeable rolls on their overhung ends, for treating the tubes to cut and weld, as specified, in combination with means for rotating such shafts, means for moving them apart and together, and a furnace closely adjacent and in line with one of the shafts, arranged to allow the heated tubes to be thrust from the furnace upon one of the rolls by a short endwise movement while the tubes are apart, and to be seized and rotated, bringing the rolls together, all substantially as herein specified.

3. In combination with the furnace P, shafts B C, and operating means, as shown, the removable plate K and adjustable bearing M, arranged for joint operation as herein specified.

In testimony whereof I have hereunto set hand, at New York city, New York, this 14th day of August, 1880, in the presence of two subscribing witnesses.

JAMES SADLER.

Witnesses:
 CHARLES C. STETSON,
 WM. C. DEY.